(12) United States Patent
Otake et al.

(10) Patent No.: US 7,460,158 B2
(45) Date of Patent: Dec. 2, 2008

(54) RECORDING MATERIAL CONSUMPTION CONTROL FOR AN IMAGE FORMING APPARATUS

(75) Inventors: Ritsuko Otake, Kanagawa (JP); Atsushi Matsumoto, Tokyo (JP); Nobuaki Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 684 days.

(21) Appl. No.: 10/944,761

(22) Filed: Sep. 21, 2004

(65) Prior Publication Data

US 2005/0068553 A1 Mar. 31, 2005

(30) Foreign Application Priority Data

Sep. 25, 2003 (JP) ............................. 2003-333444
Nov. 28, 2003 (JP) ............................. 2003-400744

(51) Int. Cl.
*H04N 5/228* (2006.01)
(52) U.S. Cl. .................................................. 348/222.1
(58) Field of Classification Search ............... 348/222.1
See application file for complete search history.

(56) References Cited

U.S. PATENT DOCUMENTS 5,909,244 A * 6/1999 Waxman et al. .......... 348/222.1
6,023,344 A * 2/2000 Yabe .......................... 358/296
6,057,932 A   5/2000 Yoshida et al.
2002/0130957 A1 * 9/2002 Gallagher et al. ........... 348/222
2004/0070676 A1 * 4/2004 Lawther et al. .......... 348/222.1

FOREIGN PATENT DOCUMENTS

| JP | 9-37094  | 2/1997 |
| JP | 10-73978 | 3/1998 |
| JP | 10-86413 | 4/1998 |

* cited by examiner

*Primary Examiner*—James M Hannett
(74) *Attorney, Agent, or Firm*—Fitzpatrick, Cella, Harper & Scinto

(57) ABSTRACT

An image processing apparatus, which supplies image signals to an image forming apparatus, includes a storage unit that stores a limiting value of a sum of signal levels of output image signals, an input unit that inputs C, M, Y and K signals, a first comparison unit that compares the limiting value and the sum of the signal levels, an under color removal unit that replaces a predetermined level of C, M and Y signals with a K signal in an under color removal process when the sum of the signal levels of the input signals exceeds the limiting value, a second comparison unit that compares the limiting value and the sum after undergoing the under color removal process, and where the sum after the under color removal process exceeds the limiting value, an adjustment unit that reduces the C, M and Y signals after undergoing the under color removal process at an identical rate so as to reduce the sum to less than the limiting value.

16 Claims, 11 Drawing Sheets

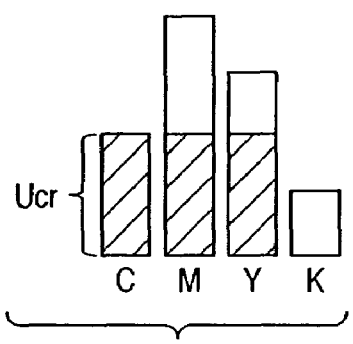 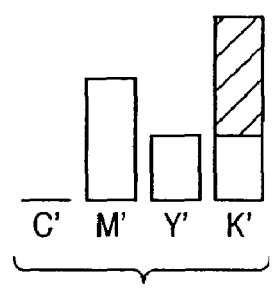 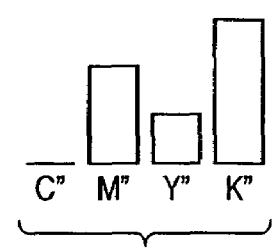
F I G. 6A    F I G. 6B    F I G. 6C

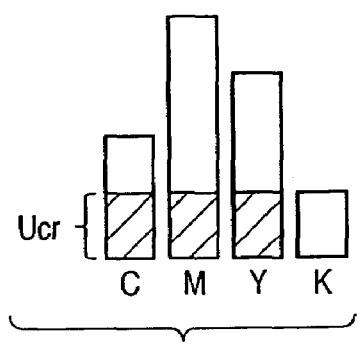 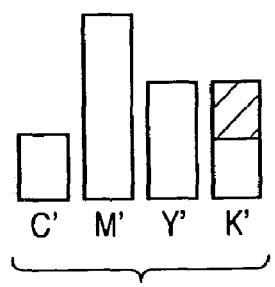 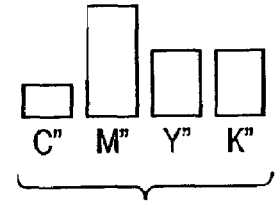
FIG. 7A  FIG. 7B  FIG. 7C

FIG. 10A

| Bit | 0 | 8 | 16 | 24 | 32 | 40 | 42 |
|---|---|---|---|---|---|---|---|
| | R | G | B | alpha | attribute | 0b001 | |

COLOR MODE (RGB)

FIG. 10B

| Bit | 0 | 8 | 16 | 24 | 32 | 40 | 42 |
|---|---|---|---|---|---|---|---|
| | C | M | Y | K | attribute | 0b010 | |

COLOR MODE (CMYK)

FIG. 10C

| Bit | 0 | 8 | 16 | 24 | 32 | 40 | 42 |
|---|---|---|---|---|---|---|---|
| | K | 0×0 | | | attribute | 0b011 | |

BLACK AND WHITE MODE

RECORDING MATERIAL CONSUMPTION CONTROL FOR AN IMAGE FORMING APPARATUS

CLAIM OF PRIORITY

This application claims priorities from Japanese Patent Application No. 2003-333444 filed on Sep. 25, 2003, and Japanese Patent Application No. 2003-400744 filed on Nov. 28, 2003, the entire contents of which are incorporated herein by reference.

FIELD OF THE INVENTION

The present invention relates to a technology for processing image data supplied to an image forming apparatus such as a color printer or a color copier that forms a color image by electrophotographic or inkjet printing methods, and more particular, to a technology for controlling the amount of toner, ink or other recording material consumed in the process of forming an image.

BACKGROUND OF THE INVENTION

In image forming apparatuses that form color images by electrophotographic or inkjet printing methods, during image formation the amount of toner or ink is adjusted in response to the image signal. In an apparatus of this type, a toner/ink consumption reduction mode is often provided for reducing the amount of ink or toner consumed and thereby reduce running costs. Moreover, when C, M, Y and K (CMYK) signals are input from an external source and an image is output, it is sometimes necessary to place a limit on the amount of toner or ink adhered to a unit of surface area of a recording medium, depending on the characteristics of the image forming portion of the printer, the characteristics of the toner or ink and the processing method used for further increasing printing speed. In such cases, a process is carried out to lower the overall signal level of the image signals to a constant limiting value so as to keep the amount of toner or ink consumed within the capabilities of the printer. In such a processing method, it is known that the CMYK image signal levels are reduced to a certain constant proportion, as described, for example, in Japanese Laid-Open Patent Publication No. 9-37094, Japanese Laid-Open Patent Publication No. 10-73978 and U.S. Pat. No. 6,023,344.

Specifically, in the example of a color copier, when converting from R, G and B (RGB) information or other such luminance information input from a scanner to CMYK density information, a conversion table is designed so that the post-conversion density information does not exceed a limiting value.

In a color printer that generates print images using luminance information such as RGB, similarly to the color copier, a conversion table for converting luminance information to CMYK density information is designed so that post-conversion density information does not exceed a limiting value, so as to control the amount of toner or ink consumed.

A conventional color printer generates print images using CMYK density information. Luminance information (RGB information) is converted to CMYK density information for each of the characters and photographic objects, comprised in the print image. While carrying out such conversions, the conversion table used when converting from the luminance information to the CMYK density information is designed so that the converted CMYK density information does not exceed a limiting value, so as to control the amount of toner or ink consumed.

With a color composite machine, because the scanned image and the generated print data are stored on a hard disk as a mail box function and sent to a host PC via a network as a transmission function, the image data is generated in dot sequence. When print image data is generated as a color printer function, there is a CMYK mode that generates print image data using density information CMYK and a RGB mode that generates print image data using luminance information such as RGB. When the print image data is generated using CMYK density information, as with the color printer described above, when converting each graphic object to CMYK information, the conversion table is designed so that the post-conversion density information does not exceed a limiting value, so as to control the amount of toner or ink consumed.

In the conventional generation of print image data using CMYK density information, as described above, the CMYK print information of each graphic object is converted to CMYK density information, and the print image data is generated using that graphic object.

In the generation of print image data, when performing logical operations between a plurality of objects and generating pixel data for printing, an overprint function, which adds object color to a background object, and a trapping function, which expands the objects slightly in order to correct a color blur due to the electrophotographic process and slightly overlaps the edges of different colors, are sometimes used. In these cases, even though the amount of toner or ink consumed by each individual graphic object might be within the limiting value, there are nevertheless pixel data which exceed these limiting values in the print image data, which then lead to excess toner or ink consumption and cause the toner or ink device to deteriorate.

Further, when a process of reducing the amount of toner or ink, as described above, is carried out, the quality of the image declines, such as fainting of with the overall color of the printed matter output, and greater color changes than anticipated, and so forth.

SUMMARY OF THE INVENTION

The present invention has been made in consideration of the above situation, and has as its object to improve output image reproducibility while limiting the amount of toner or ink adhering per unit area.

According to the present invention, the foregoing object is attained by providing an image processing apparatus that supplies an image signal to an image forming apparatus that forms an image on a recording medium using recording material, the image processing apparatus comprising: a storage unit that stores a limiting value of a sum of signal levels of image signals output to the image forming apparatus; an input unit that inputs C, M, Y and K signals as image signals; a first comparison unit that compares the limiting value and the sum of the signal levels of the input C, M, Y and K signals; an under color removal unit that replaces a predetermined level of C, M and Y signals with a K signal in an under color removal process when the sum of the signal levels of the input C, M, Y and K signals exceeds the limiting value; a second comparison unit that compares the limiting value and the sum of the signal levels of the C, M, Y and K signals after undergoing the under color removal process; and an adjustment unit that, where the sum after the under color removal process exceeds the limiting value, reduces the C, M and Y signals after undergoing the under color removal process at an identical rate so as to reduce the sum after the under color removal process to less than the limiting value.

According to the present invention, the foregoing object is also attained by providing an image processing method that supplies an image signal to an image forming apparatus that forms an image on a recording medium using recording material, the image processing method comprising: inputting C, M, Y and K signals as image signals; reading out from a storage unit a limiting value of a sum of signal levels of image signals output to the image forming apparatus; comparing the limiting value and the sum of the signal levels of the input C, M, Y and K signals; replacing a predetermined level of C, M and Y signals with a K signal in an under color removal process when the sum of the signal levels of the input C, M, Y and K signals exceeds the limiting value; comparing the limiting value and the sum of the signal levels of the C, M, Y and K signals after undergoing the under color removal process; and reducing, where the sum after the under color removal process exceeds the limiting value, the C, M and Y signals after undergoing the under color removal process at an identical rate so as to reduce the sum after the under color removal process to less than the limiting value.

Further, the foregoing object is also attained by providing an image processing apparatus comprising: a communications unit that receives print information; an image processing unit that processes the print information received by the communications unit and generates image data in dot sequence; a temporary storage unit that temporarily stores at least a portion of the image data generated by the image processing unit; a printing unit that prints based on the image data stored in the temporary storage unit; and a limiting unit that determines whether or not the image data is composed of density information, and if so, compares an addition value of the density information of each pixel of the image data and a predetermined limiting value, and, if the addition value is greater than the predetermined limiting value, reduces the addition value to equal to or less than the predetermined limiting value, wherein the limiting unit is provided between the image processing unit and the temporary storage unit.

Furthermore, the foregoing object is also attained by providing an image processing method executed by an image processing apparatus which comprises a communications unit that receives print information, an image processing unit that processes the print information received by the communications unit and generates image data in dot sequence, a temporary storage unit that temporarily stores at least a portion of the image data generated by the image processing unit, and a printing unit that prints based on the image data stored in the temporary storage unit, image processing method comprising: determining whether or not the image data is composed of density information; comparing an addition value of the density information of each pixel of the image data and a predetermined limiting value, where the image data is composed of density information; and reducing the addition value to equal to or less than the predetermined limiting value, if results of the comparison indicate that the addition value is greater than the predetermined limiting value.

Further, the foregoing object is also attained by providing an image processing method executed by an image processing apparatus comprising a communications unit that receives print information and an image processing unit that generates processed image data from the print information received by the communications unit, the image processing method comprising: determining whether or not the image data is composed of density information; comparing an addition value of the density information of each pixel of the image data and a predetermined limiting value, where the image data is composed of density information; and reducing the addition value to equal to or less than the predetermined limiting value, if results of the comparison indicate that the addition value is greater than the predetermined limiting value.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 6A, 6B and 6C are diagrams schematically expressing changes in CMYK signal levels according to the second embodiment of the present invention;

FIGS. 7A, 7B and 7C are diagrams schematically expressing changes in CMYK signal levels according to the third embodiment of the present invention;

FIGS. 10A, 10B and 10C are diagrams schematically showing the bit structure of the data signals shown in FIG. 9.

DETAILED DESCRIPTION OF THE PREFERRED EMBODIMENTS

Preferred embodiments of the present invention will now be described in detail in accordance with the accompanying drawings. It should be noted that, for simplicity of description, the image signals are assumed to be 8-bit signals for each color, in other words having values of from 0 to 255. However, the image signals of the present invention are not limited to such image signals.

First Embodiment

Figure 1:
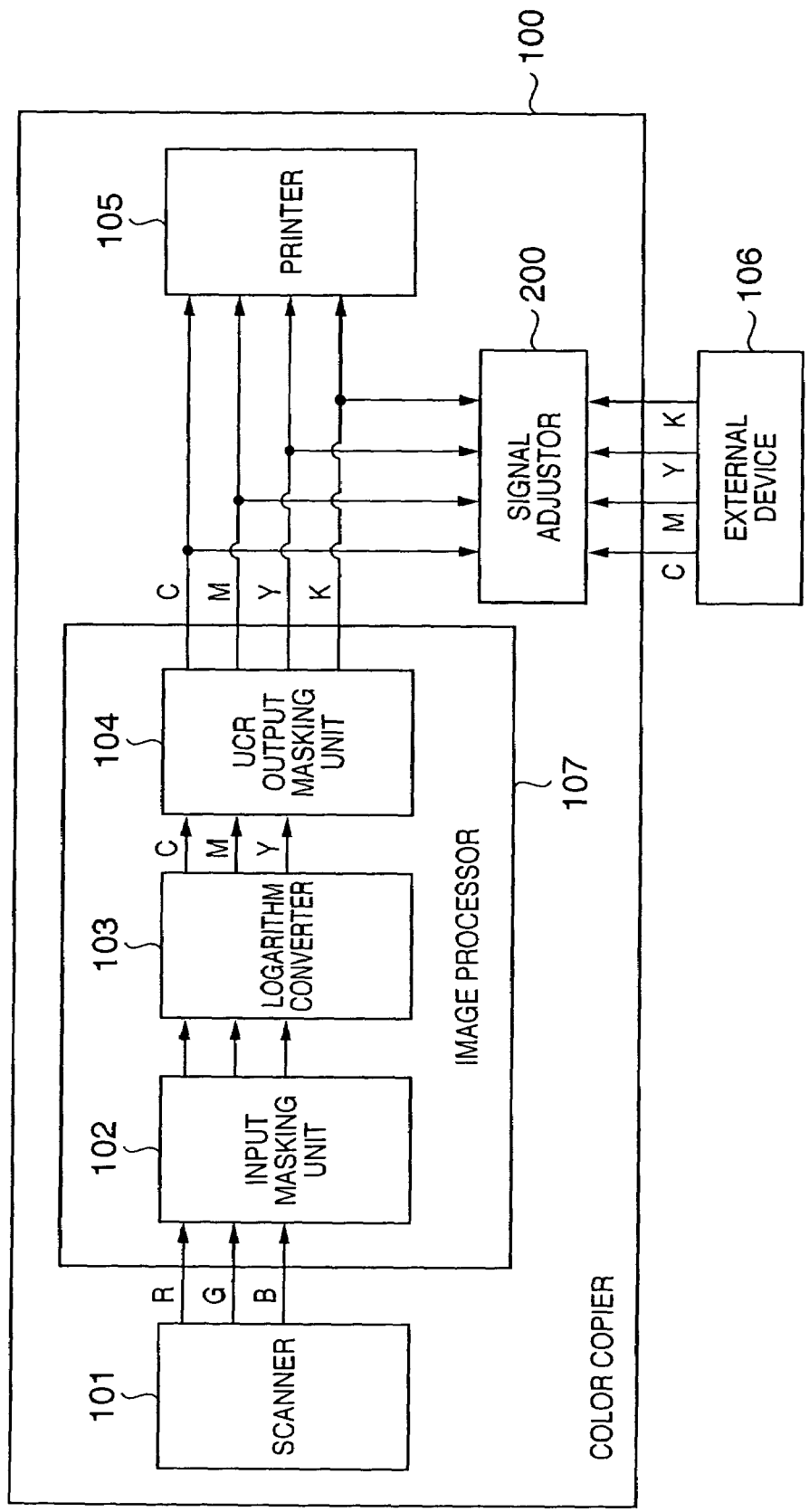
FIG. 1 is a block diagram showing an example of the construction of a color copier according to an embodiment of the present invention.

FIG. 1 is a block diagram showing an example of the construction of a color copier 100 according to the first embodiment of the present invention.

First, in a normal copy operation, RGB signals of an original image output from a scanner 101 are input and masked by an input masking unit 102 of an image processor 107, are logarithm-converted by a logarithm converter 103 and converted into C, M and Y (CMY) image signals. These CMY image signals are then subjected to under color removal and output masking processed by a UCR output masking unit 104, and output to a printer 105 as CMYK image signals.

In a normal copy operation, because the UCR amount and a masking coefficient are set at the UCR output masking unit 104 in order to keep the level of the image signals within the processing capacity of the printer 105, there is no input to the printer 105 of image signals with levels exceeding the processing capacity of the printer 105.

Next, a description is given of an image forming operation according to CMYK image signals input from an external device 106. The CMYK image signals input from the external device 106, after being adjusted to a signal level that is within the processing capacity of the printer 105 by a signal adjustor 200, are output to the printer 105. As a result, no matter what type of CMYK signals are input from the external device 106, signals input to the printer 105 stays within the processing capacity of the printer 105.

Figure 2:
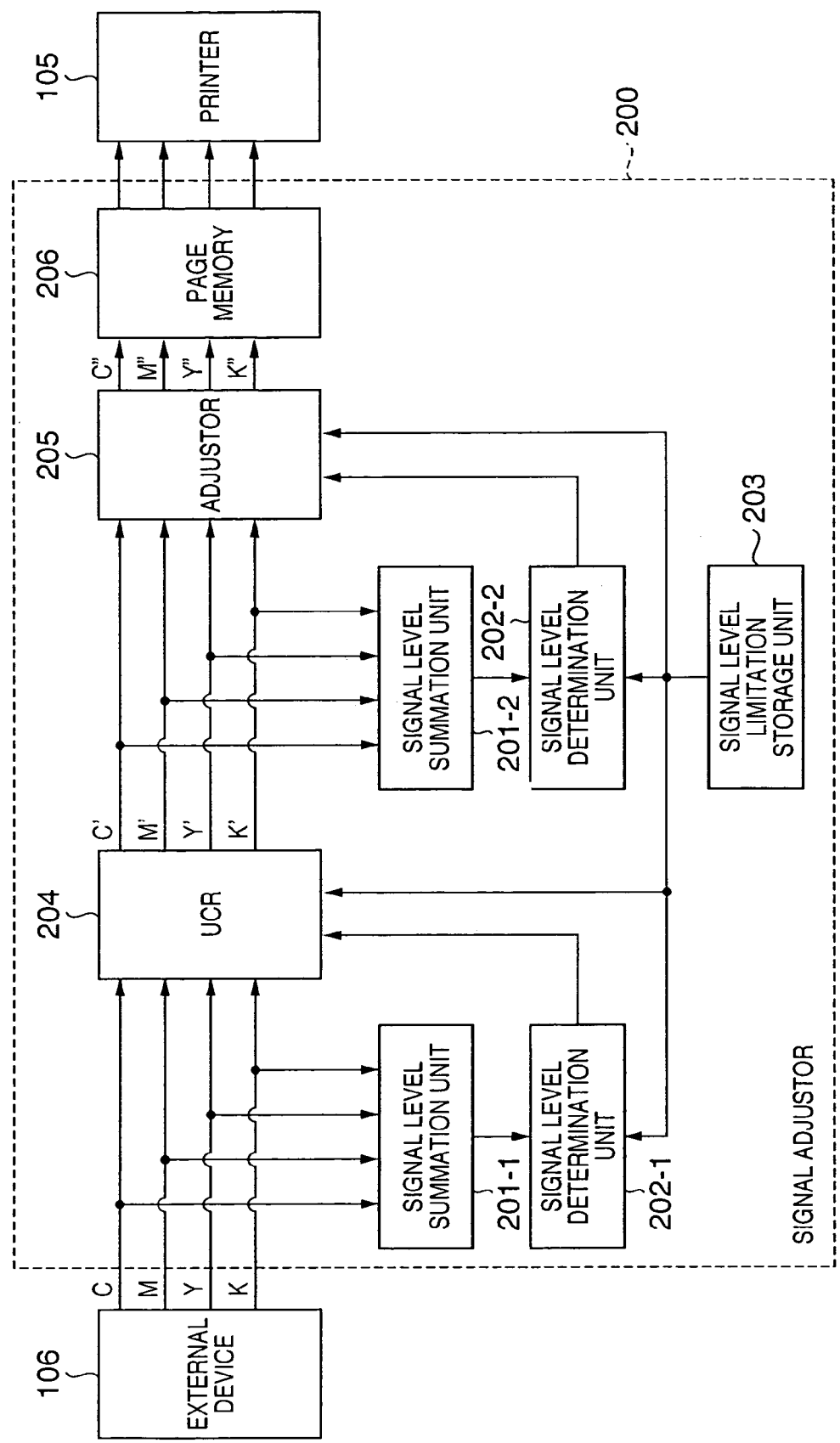
FIG. 2 is a block diagram showing an example of the construction of a signal adjustment unit according to an embodiment of the present invention.
Figure 3:
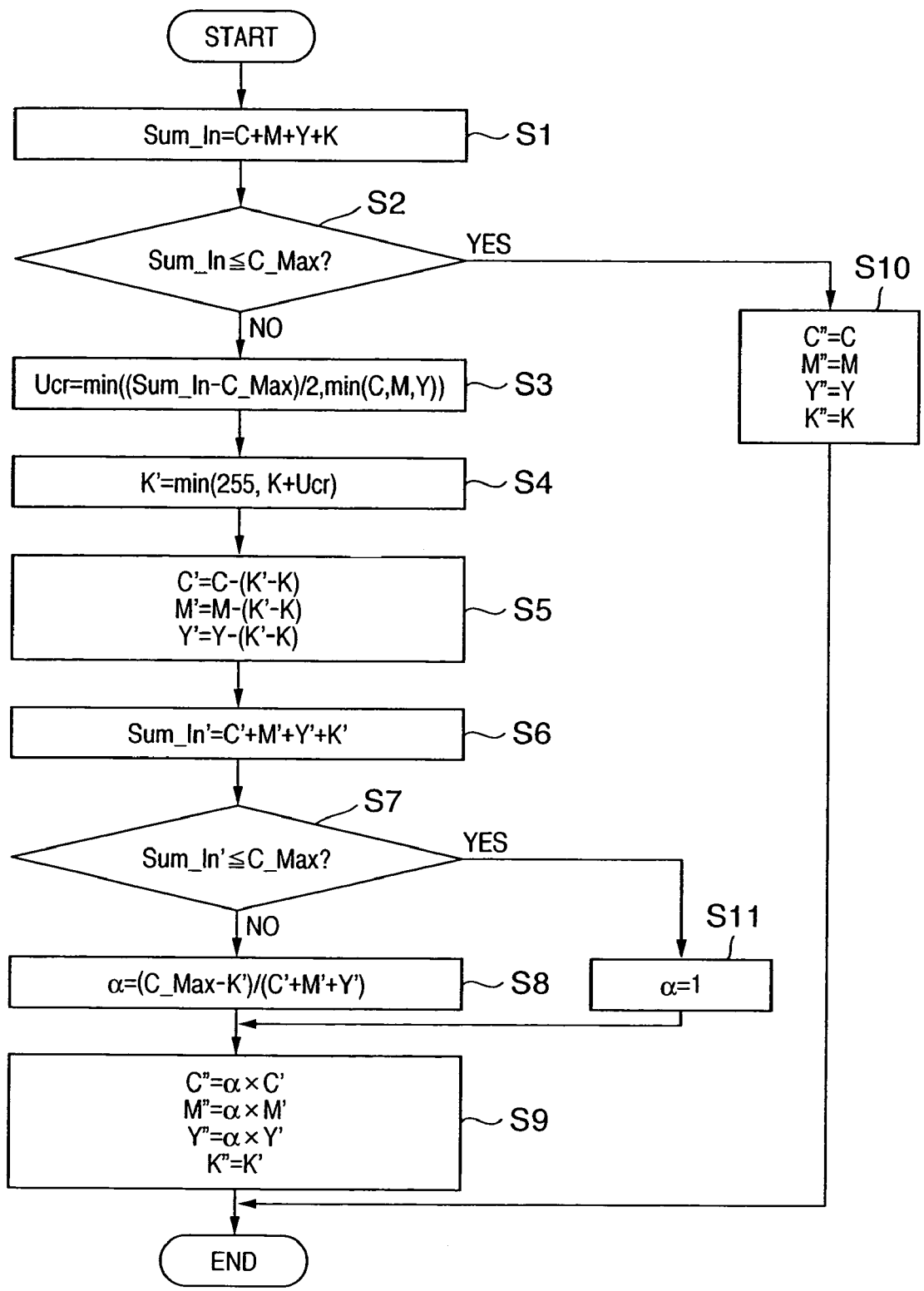
FIG. 3 is a flow chart showing signal adjustment processing according to a first embodiment of the present invention.

FIG. 2 is a block diagram showing a detailed example of the construction of the signal adjustor 200. FIG. 3 is a flow chart showing processes performed at the signal adjustor 200. A description is now given of the operation of the signal adjustor 200 in the first embodiment of the present invention, with reference to FIGS. 2 and 3.

An upper limit C_Max of the sum total of CMYK signals per pixel is stored in a signal level limitation storage unit 203. The upper limit C_Max may be a constant determined in advance in accordance with the characteristics of the printer, or it may be a variable that is determined by reference to a table designated by a toner or ink usage reduction level that the user can specify.

First, in step S1, a signal level summation unit 201-1 calculates a sum total Sum_In of the signal levels of the CMYK signals at each pixel sent from the external device 106 using the following equation (1).

$$Sum\_In = C+M+Y+K \quad (1)$$

Next, in step S2, a signal level determination unit 202-1 compares the upper limit C_Max stored in the signal level limitation storage unit 203 and the sum total Sum_In obtained by the signal level summation unit 201-1, and outputs the result of that comparison to a UCR 204. If within the upper limit C_Max, the input CMYK signals are used as is and can be output by the printer 105, and therefore the process proceeds to step S10 put through the UCR 204 and an adjustor 205 processing, and the input CMYK signal values are developed as is to a page memory 206 and output, where processing is ended. If the input CMYK signals are not within the upper limit C_Max, then processing proceeds to step S3.

Step S3 to step S5 is the UCR (under color removal) process. In the under color removal process of the UCR 204, an under color removal amount Ucr is calculated first. In this first embodiment, that calculation is performed using the following equation (2) (step S3).

$$Ucr = Min(Sum\_In - C\_Max)/2, Min(C,M,Y)) \quad (2)$$

This process selects the minimum from among the four values C, M, Y and ½ of the result of subtracting the upper limit C_Max from the signal level Sum_In. If the results of the determination performed by the signal level determination unit reveals that the sum total Sum_In is within the limiting value, the processing of UCR 204 can be put through by making Ucr=0 (step S10).

Figure 4A:
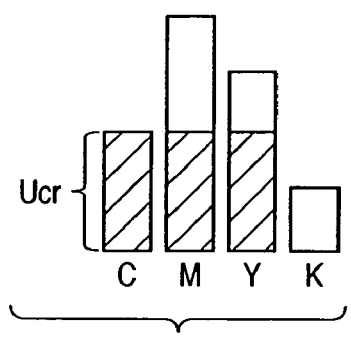
FIGS. 4A, 4B and 4C are diagrams schematically expressing changes in CMYK signal levels according to the first embodiment of the present invention.
Figure 4B:
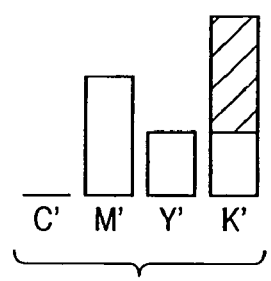
Figure 4C:
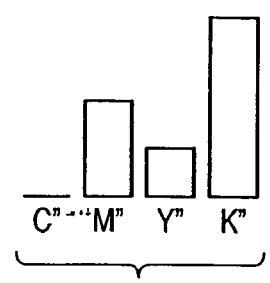

FIGS. 4A-4C schematically express changes in CMYK signal levels due to processing according to the first embodiment. FIG. 4A expresses original CMYK signal levels and Ucr levels calculated in step S3. In particular, the drawing shows an example of signal levels in a case in which Min(C,M,Y) are chosen as the Ucr.

Next, in step S4, a new K signal, K,' is determined using the following equation (3).

$$K' = Min(255, K+Ucr) \quad (3)$$

Thereafter, a value equivalent to the increase from K of the newly determined K' is subtracted from each of CMY signals and new CMY signals, C', M' and Y' signals are generated using the following equations (4) (step S5).

$$C' = C-(K'-K)$$

$$M' = M-(K'-K)$$

$$Y' = Y-(K'-K) \quad (4)$$

An example of signal levels obtained after the processing of steps S4 and S5 is shown in FIG. 4B. In particular, FIG. 4B shows a case in which K+Ucr is chosen as the K'.

In step S6, these results are input to a signal level summation unit 201-2 and a CMYK signal sum Sum_In' is calculated from the following equation (5):

$$Sum\_In' = C'+M'+Y'+K' \quad (5)$$

It is then determined whether or not the calculated Sum_In' is within the upper limit C_Max in a signal level determination unit 202-2 (step S7).

In the determination made in step S7, if the answer is NO, then processing proceeds to step S8 and an adjustment level α is calculated with the adjustor 205 using the following equation (6). Then, in step S9, the adjustor 205 reduces C', M', Y' by the same proportion using the adjustment level α.

$$\alpha = (C\_Max - K')/(C'+M'+Y') \quad (6)$$

By contrast, if the determination made in step S7 is YES, then processing proceeds to step S11 and α is set to 1. By so doing, in step S9, the adjustor 205 outputs the post-UCR-processed CMYK image signals as is.

Next, in step S9 new values C", M", Y", K" are calculated using the following equation (7). Here, the value of K does not change.

$$C'' = \alpha \times C'$$

$$M'' = \alpha \times M'$$

$$Y'' = \alpha \times Y'$$

$$K'' = K' \quad (7)$$

An example of the signal levels obtained as a result of the process performed in step S9 is shown in FIG. 4C.

The signals obtained in the manner described above are output to the page memory 206 and the series of signal adjustment processes at a given pixel is finished.

The above-described process is carried out for every pixel in the image data and signals kept within the limiting value are output to the printer 105.

As described above, according to the first embodiment of the present invention, because the amount of toner or ink adhered to a unit surface area can be limited to a designated level, breakdown of the printer can be avoided and also high image reproducibility can be achieved while reducing consumption of consumables such as toner or ink.

In addition, in order to save the K signal after under color removal has been carried out, black color component of the image can be saved. As a result, the image's overall density reproducibility is improved and output of high quality images can be attained.

Second Embodiment

Figure 5:
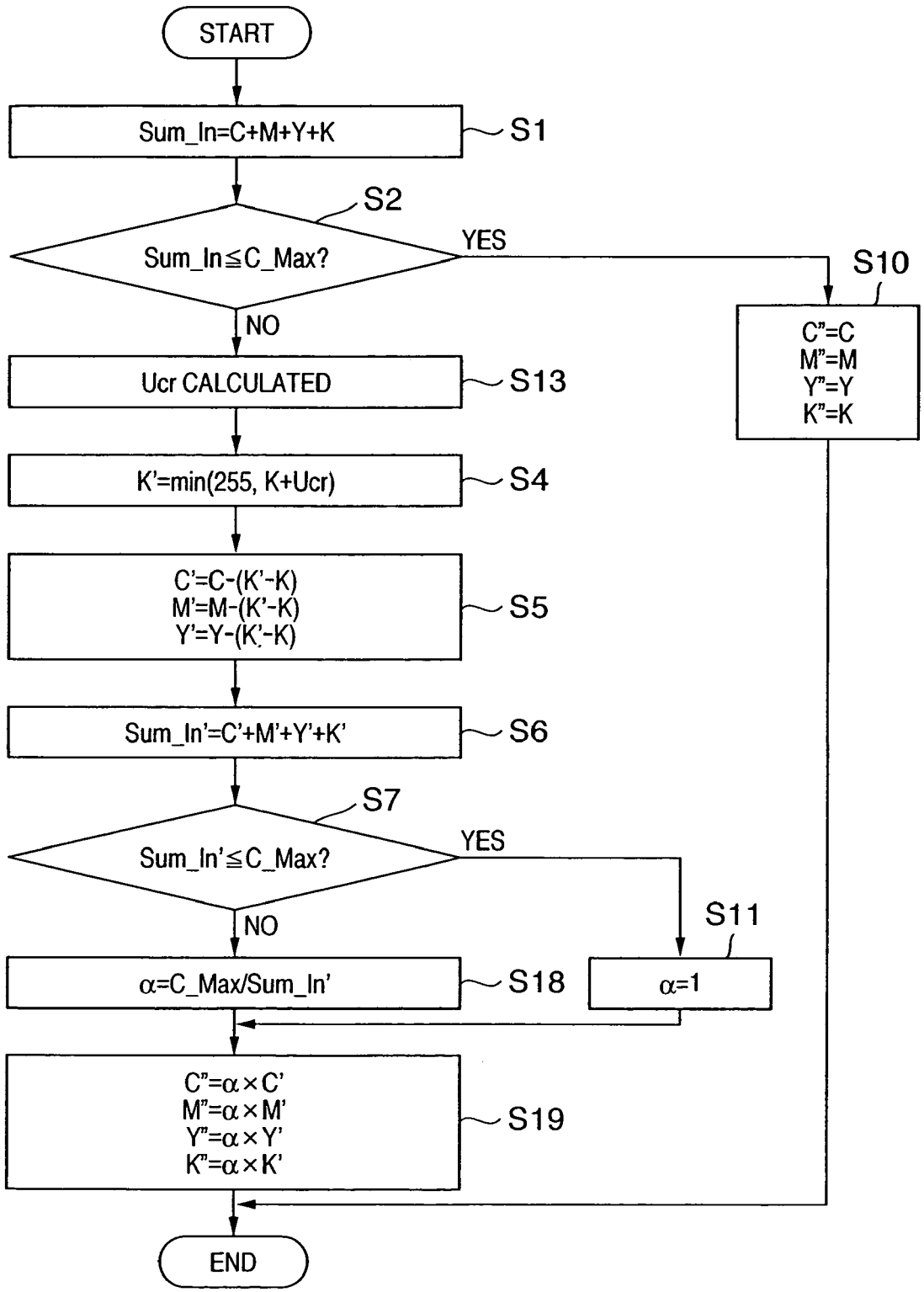
FIG. 5 is a flow chart showing signal adjustment processing according to a second embodiment and a third embodiment of the present invention.

Next, a description is given of a second embodiment of the present invention with reference to FIG. 5.

In the second embodiment, the way in which the adjustment level α is calculated using the adjustor 205 (step S18) and the way in which the signals are calculated (step S19) are different from those of the first embodiment. Other than that, the same processes as shown in FIG. 3 are carried out in FIG. 5, including step S13 in FIG. 5 in which the same process as in step S3 in FIG. 3 is carried out. Therefore the same reference numerals are used and a description thereof is omitted here.

In the first embodiment in step S8 the adjustment level α is calculated using equation (6). On the other hand, the adjustment level a is calculated using equation (8) in the second embodiment (step S18).

$$\alpha = C\_Max/Sum\_In' \quad (8)$$

In step S19, the signal value of signal K' is also decreased at the same proportion as are the other signals C', M', Y' using the calculated adjustment level α.

FIGS. 6A-6C schematically express the change in CMYK signal levels due to processing by the second embodiment. FIG. 6A shows original CMYK signal levels and Ucr amounts where Min(C,M,Y) has been chosen as the Ucr. FIG. 6B shows post-UCR-processed signal levels where K+Ucr has been chosen as K'. Further, the results of carrying out a process of reducing the signals at the same rate so as to keep their sum within limiting values is shown in FIG. 6C. Unlike in FIG. 4C, here the value of K" is less than that of K'.

Thus, as described above, in the second embodiment of the present invention as well, because the amount of toner or ink adhered to a unit surface area can be limited to a designated level, breakdown of the printer can be avoided and also high image reproducibility can be achieved while reducing consumption of consumables such as toner or ink.

Third Embodiment

Next, a description is given of a third embodiment of the present invention.

In the third embodiment, the under color removal amount Ucr in step S13 in FIG. 5 is calculated using the following equation (9):

$$Ucr = Min((Sum\_In - C\_Max)/2, R \times Min(C,M,Y)) \quad (9)$$

It should be noted that R indicates the under color removal level, which is either specified by the user or stored previously in the apparatus. Moreover, $0 \geq R \geq 1$. However, Ucr=0 when the output results of the signal level determination unit 202-1 show that the signal level is within the limiting value.

In this method of calculating Ucr, in contrast to the first and second embodiments in which the amount of toner used is zero for any single color, the signal levels leave a minimum color at a constant proportion. Otherwise, the third embodiment is identical to the first embodiment and therefore a description thereof is omitted here.

FIGS. 7A-7C schematically express changes in CMYK signal levels due to processing by the third embodiment. FIG. 7A shows the original CMYK signal levels and Ucr, where a proportion R with respect to a minimum signal C is used as the Ucr. FIG. 7B shows post-UCR-processed signal levels.

Further, FIG. 7C shows the results where the signals have been reduced at the same rate so as to keep their sum within limiting values as described in the second embodiment. It should be noted that the processes of the first embodiment described with reference to steps S8 and S9 shown in FIG. 3 may be performed instead.

Fourth Embodiment

Figure 8:
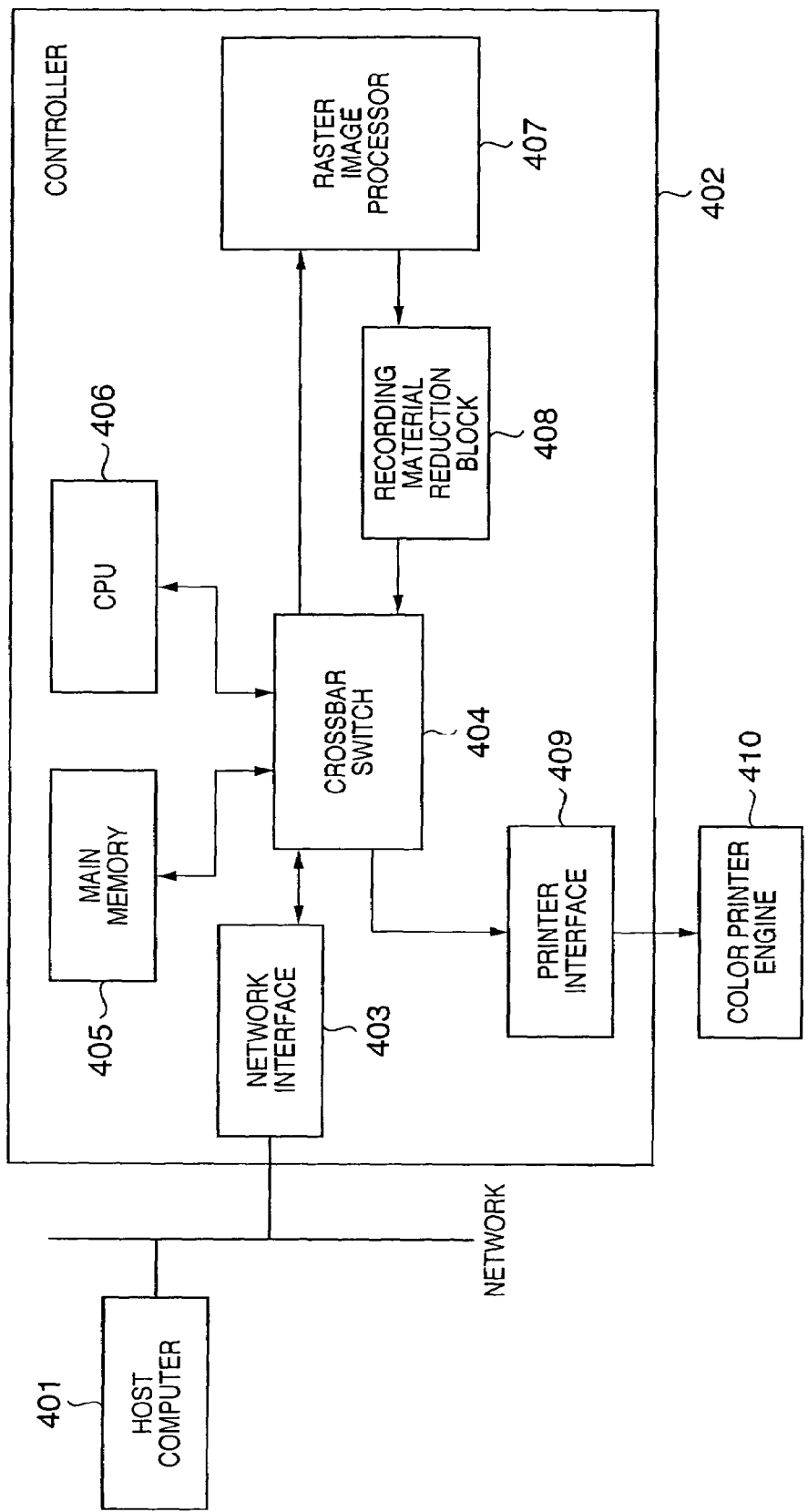
FIG. 8 is a block diagram showing the system architecture of an image processing apparatus according to the fourth embodiment of the present invention.

A description is now given of a fourth embodiment of the present invention, with reference initially to FIG. 8.

FIG. 8 is a block diagram showing the system architecture of an image processing apparatus according to the fourth embodiment of the present invention. The image processing apparatus includes at least a controller 402 and a color printer engine 410. The controller 402 is comprised of a network interface 403, a crossbar switch 404, a main memory 405, a CPU 406, a raster image processor 407, a recording material reduction block 408 and a printer interface 409.

The network interface 403 receives data from a network. The crossbar switch 404 actively selects the path when transmitting and receiving data among a number of CPUs and memories. The main memory 405 stores data and computer programs. The CPU 406 functions as a computing device of the controller 402. The raster image processor 407 processes a display list stored in the main memory 405 and generates final print image data in dot sequence. The recording material reduction block 408 controls the amount of toner or ink consumed when the image is printed. The printer interface 409 transmits the final print image data to the color printer engine 410.

Next, a description is given of the operation of the controller 402 having a construction like that described above. When a host computer 401 receives a request from the user to print out a document, the host computer 401 converts the document into a page description language (PDL) such as LIPS at a printer driver and transfers the PDL data to the image processing apparatus controller 402 via the network.

At the controller 402, the network interface 403 receives PDL data sent over the network and stores the data in the main memory 405 via the crossbar switch 404. The CPU 406 interprets the PDL and converts it into a display list that can be processed by the raster image processor 407 and stores the display list in a separate area of the main memory 405.

Next, the raster image processor 407 is activated and processes the display list stored in the main memory 405 so as to generate final print image data in dot sequence. Then, final print image pixel data is transferred to the recording material reduction block 408. If the transmitted pixel data is density information, the recording material reduction block 408 compares addition value of the density information CMYK and a predetermined limiting value. The results of this comparison are converted so that, if the addition value is above the limiting value the addition value of each color is kept below the limiting value, and thereafter, pixel information is stored in a temporary storage buffer area of the main memory 405.

When processing of a page is finished, the raster image processor 407 sends a signal to the CPU 406 notifying the CPU 406 that the page is finished. Next, the CPU 406 activates the printer interface 409 and the final print image data stored in the memory 405 is sent to the color printer engine 410 via the printer interface 409 and is printed out. At this time, if the pixel data is generated as R, G and B data, it is converted into CMYK data at the printer interface 409.

Figure 9:
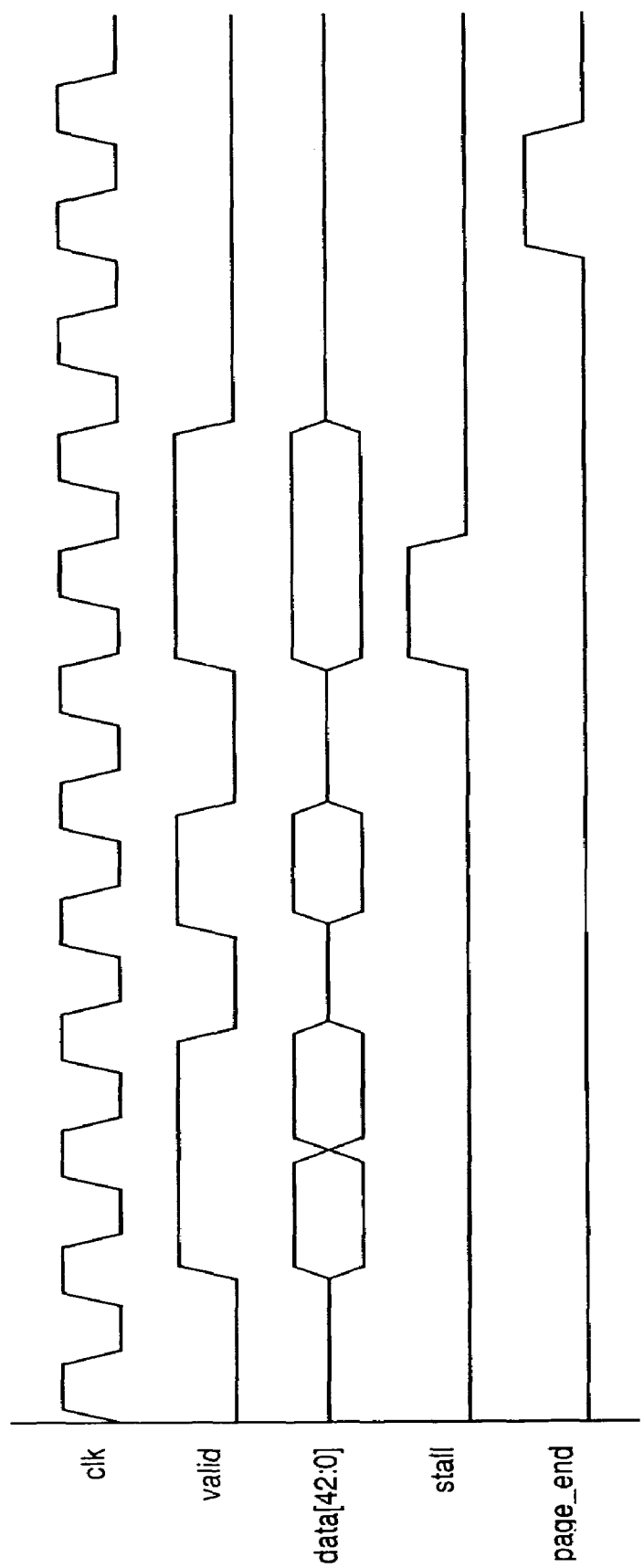
FIG. 9 is a timing chart showing bus protocol between a recording material reduction block and an image processor according to the fourth embodiment of the present invention.

FIG. 9 is a timing chart showing bus protocol between a recording material reduction block 408 and a raster image processor 407 according to the fourth embodiment of the present invention. Data signals, data [42:0], which includes the pixel information, and validity signals, are output in synchrony with a clock from the Raster Image Processor 407. The recording material reduction block 408 asserts a stall signal if it cannot accept pixel information, by which the transfer from the raster image processor 407 can be stopped. In order to notify the recording material reduction block 408 of the end of the page, the raster image processor 407 asserts a page_end signal indicating the end of the page.

FIGS. 10A-10C schematically show the bit structure of the data signal, data[42:0], shown in FIG. 9. When the raster image processor 407 is in a color mode, pixel information is contained in 0 bits to 31 bit, image area information in 32 bit to 39 bit, and mode information in 40 bit to 42 bit. The recording material reduction block 408 checks the mode information and controls consumption of recording material when the mode is CMYK color mode. For all other modes, the recording material reduction block 408 transfers the input pixels as is, without conversion, to the downstream blocks. This is because, where the pixels are comprised of R. G and B pixels or are comprised of gray scale pixels, consumption is limited for all pixels using the conventional process.

Figure 11:
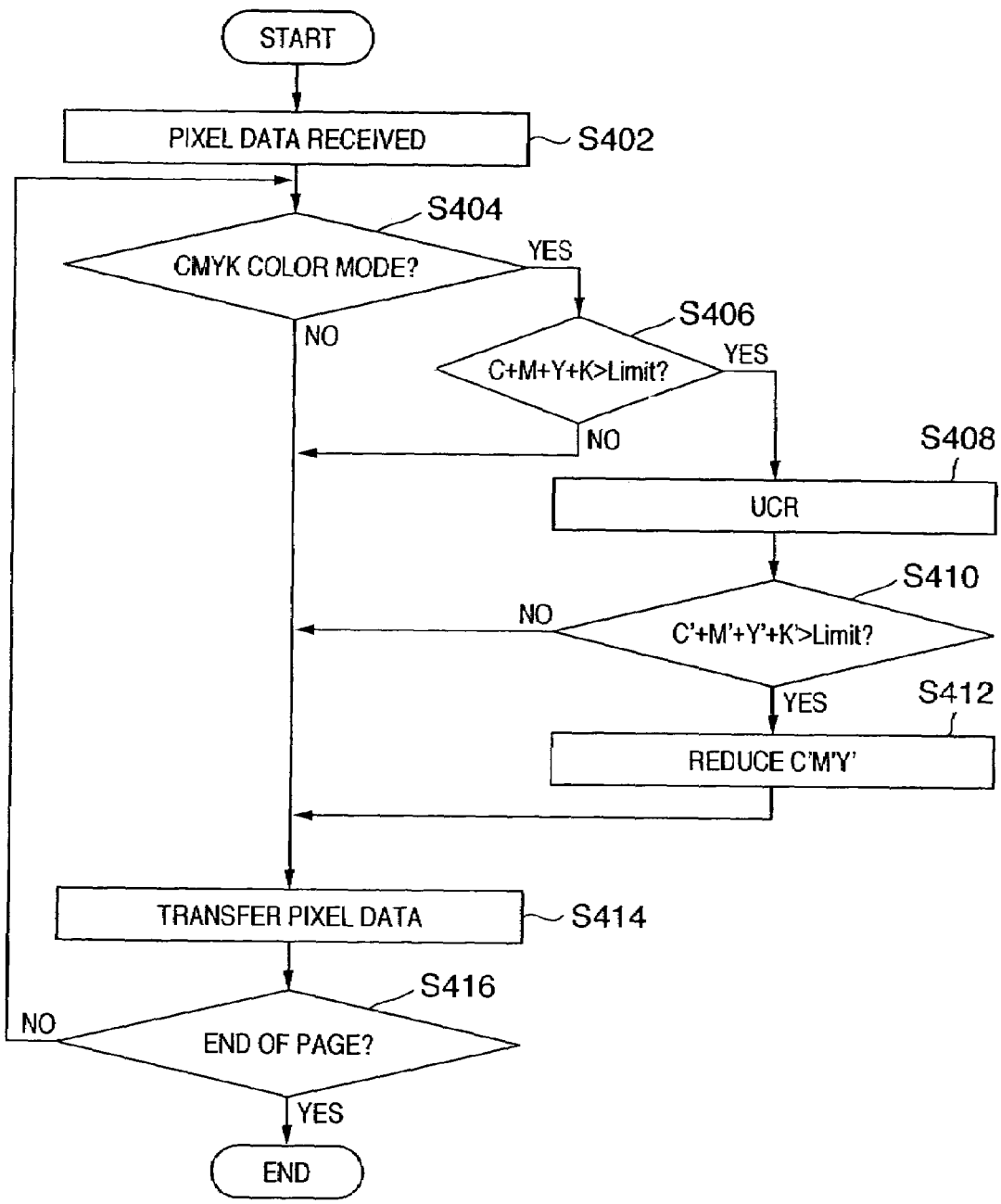
FIG. 11 is a flow chart showing the operation of a recording material reduction block according to the fourth embodiment of the present invention.

FIG. 11 is a flow chart showing the operation of a recording material reduction block 408 according to the fourth embodiment of the present invention. First, the pixel data is received (step S402) in the recording material reduction block 408. Next, using the mode information, it is determined whether the transfer is to be performed in CMYK color mode or in some other mode (step S404). If the transfer is not to be performed in CMYK color mode, the following pixel data is transferred to the downstream blocks (step S414). If the transfer is CMYK color mode, then it is determined whether or not the sum of CMYK data is greater than a previously determined limiting value "Limit" (step S406). If the sum of CMYK data is equal to or less than the previously determined limiting value "Limit", the pixels are transferred as is to the downstream blocks (step S414). Where the sum of CMYK data is greater than the previously determined Limit, the UCR (Under Color Removal) process is then carried out and the three gray color components CMY are reduced (step S408).

After UCR processing has changed the values of CMYK data to C', M', Y' and K' data, it is again determined whether or not their sum exceeds the previously determined Limit (step S410). If the sum of C', M', Y' and K' data is equal to or less than the previously determined Limit, then the C', M', Y' and K', data for which the pixels have been converted, are transferred as C', M', Y' and K' data to the downstream blocks (step S414). If the sum of C', M', Y' and K' data is still greater than the previously determined Limit, then the values of C', M' and Y' data are reduced at the same rate (step S412). The C'', M'', Y'' thus generated are converted so as to be equal to the value of the Limit minus K', and the converted C'', M'', Y''', K' data are transferred as a pixel to the downstream blocks (step S414). Next, it is determined whether or not it is the end of the page (step S416). If it is not the end of the page, the next pixel is received and the foregoing process repeated. If it is the end of the page, then processing ends.

By the processing described above, the amount of toner or ink consumed for all the pixels of the print image can be kept within a predetermined limiting value.

Other Embodiments

Note that the present invention can be applied to an apparatus comprising a single device (e.g. copying machine, facsimile machine) or to a system constituted by a plurality of devices (e.g. host computer, interface, scanner, printer), Furthermore, the invention can be implemented by supplying a software program that implements the functions of the foregoing embodiments, directly or indirectly, to a system or apparatus, reading the supplied program code with a computer of the system or apparatus, and then executing the program code. In this case, so long as the system or apparatus has the functions of the program, the mode of implementation need not rely upon the program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Examples of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered b the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific preferred embodiments described above thereof except as defined in the claims.

What is claimed is:

1. An image processing apparatus that supplies an image signal to an image forming apparatus that forms an image on a recording medium using recording material, the image processing apparatus comprising:

a storage unit that stores a limiting value of a sum of signal levels of image signals output to the image forming apparatus;

an input unit that inputs C, M, Y and K signals as image signals;

a first comparison unit that compares the limiting value and the sum of the signal levels of the input C, M, Y and K signals;

an under color removal unit that replaces an under color removal level of C, M and Y signals with a K signal in an under color removal process when the sum of the signal levels of the input C, M, Y and K signals exceeds the limiting value;

a second comparison unit that compares the limiting value and the sum of the signal levels of the C, M, Y and K signals after undergoing the under color removal process; and an adjustment unit that, where the sum after the under color removal process exceeds the limiting value, reduces the C, M and Y signals, but not the K signal, after undergoing the under color removal process at an identical rate so as to reduce the sum after the under color removal process to less than the limiting value.

2. The image processing apparatus according to claim 1, wherein each of the C, M and Y signals after undergoing the under color removal process is multiplied by a quotient, obtained by dividing a difference between the limiting value and the K signal after undergoing the under color removal process, by the sum of the C, M and Y signals after undergoing the under color removal process.

3. The image processing apparatus according to claim 1, wherein said adjustment unit multiplies each of the C, M and Y signals after undergoing the under color removal process by a rate obtained from a designated one or more tables.

4. The image processing apparatus according to claim 1, wherein said under color removal unit uses a minimum from among a half of a difference between the sum and the limiting value, and the smallest value of the C, M and Y signals, as the amount of the C, M and Y signals to be replaced by the K signal.

5. The image processing apparatus according to claim 1, wherein said under color removal unit uses a minimum from among a half of a difference between the sum and the limiting value, and a product obtained by multiplying the minimum values of the C, M and Y signals by a predetermined rate, as the amount of the C, M and Y signals to be replaced by the K signal.

6. The image processing apparatus according to claim 1, further comprising a control unit that controls a transmission of the input C, M, Y and K signals so that, when said first comparison unit determines that the sum of the signal levels of the input C, M, Y and K signals is equal to or less than the limiting value, the input C, M, Y and K signals are supplied as is to the image forming apparatus without being processed by said under color removal unit and said adjustment unit.

7. The image processing apparatus according to claim 6, wherein said control unit controls the transmission of the input C, M, Y and K signals so that the input C, M, Y and K signals are supplied to the image forming apparatus after undergoing the under color removal process without being processed by said adjustment unit when said second comparison unit determines that the sum after undergoing the under color removal process is equal to or less than the limiting value.

8. An image processing method that supplies an image signal to an image forming apparatus that forms an image on a recording medium using recording material, the image processing method comprising:

inputting C, M, Y and K signals as image signals;

reading out from a storage unit a limiting value of a sum of signal levels of image signals output to the image forming apparatus;

comparing the limiting value and the sum of the signal levels of the input C, M, Y and K signals;

replacing an under color removal level of C, M and Y signals with a K signal in an under color removal process when the sum of the signal levels of the input C, M, Y and K signals exceeds the limiting value;

comparing the limiting value and the sum of the signal levels of the C, M, Y and K signals after undergoing the under color removal process; and reducing, where the sum after the under color removal process exceeds the limiting value, the C, M and Y signals, but not the K signal, after undergoing the under color removal process at an identical rate so as to reduce the sum after the under color removal process to less than the limiting value.

9. A storage medium readable by a data processing apparatus, said storage medium storing a program which is executable by the data processing apparatus and comprises program codes realizing the image processing method according to claim 8.

10. An image processing apparatus comprising:

a communications unit that receives print information;

an image processing unit that processes the print information received by said communications unit and generates image data in dot sequence;

a temporary storage unit that temporarily stores at least a portion of the image data generated by said image processing unit;

a printing unit that prints based on the image data stored in said temporary storage unit; and a limiting unit that determines whether or not the image data is comprised of density information, and if so, compares an addition value of the density information of each pixel of the image data and a predetermined limiting value, and, if the addition value is greater than the predetermined limiting value, reduces the addition value to equal to or less than the predetermined limiting value, wherein said limiting unit is provided between said image processing unit and said temporary storage unit.

11. The image processing apparatus according to claim 10, wherein the pixel density information includes cyan, magenta, yellow and black information.

12. The image processing apparatus according to claim 11, wherein said limiting unit reduces the addition value to equal to or less than the limiting value through under color removal processing.

13. The image processing apparatus according to claim 10, wherein said limiting unit does not process the image data when the image data generated by said image processing unit is comprised of R, G and B information.

14. The image processing apparatus according to claim 10, wherein said limiting unit does not process the image data when the image data generated by said image processing unit is comprised of gray scale.

15. An image processing method executed by an image processing apparatus, said image processing method comprising:

receiving print information;

processing the received print information and generating image data in dot sequence;

determining whether or not the image data is comprised of density information;

comparing an addition value of the density information of each pixel of the image data and a predetermined limiting value, where the image data is comprised of density information;

reducing the addition value to equal to or less than the predetermined limiting value, if results of the comparison indicate that the addition value is greater than the predetermined limiting value;

storing temporarily at least a portion of the image data which has and has not undergone the reducing step; and printing based on the temporarily stored image data.

16. A storage medium readable by a data processing apparatus, said storage medium storing a program which is executable by the data processing apparatus and comprises program codes realizing the image processing method according to claim 15.

* * * * *